United States Patent Office 3,061,017
Patented Oct. 30, 1962

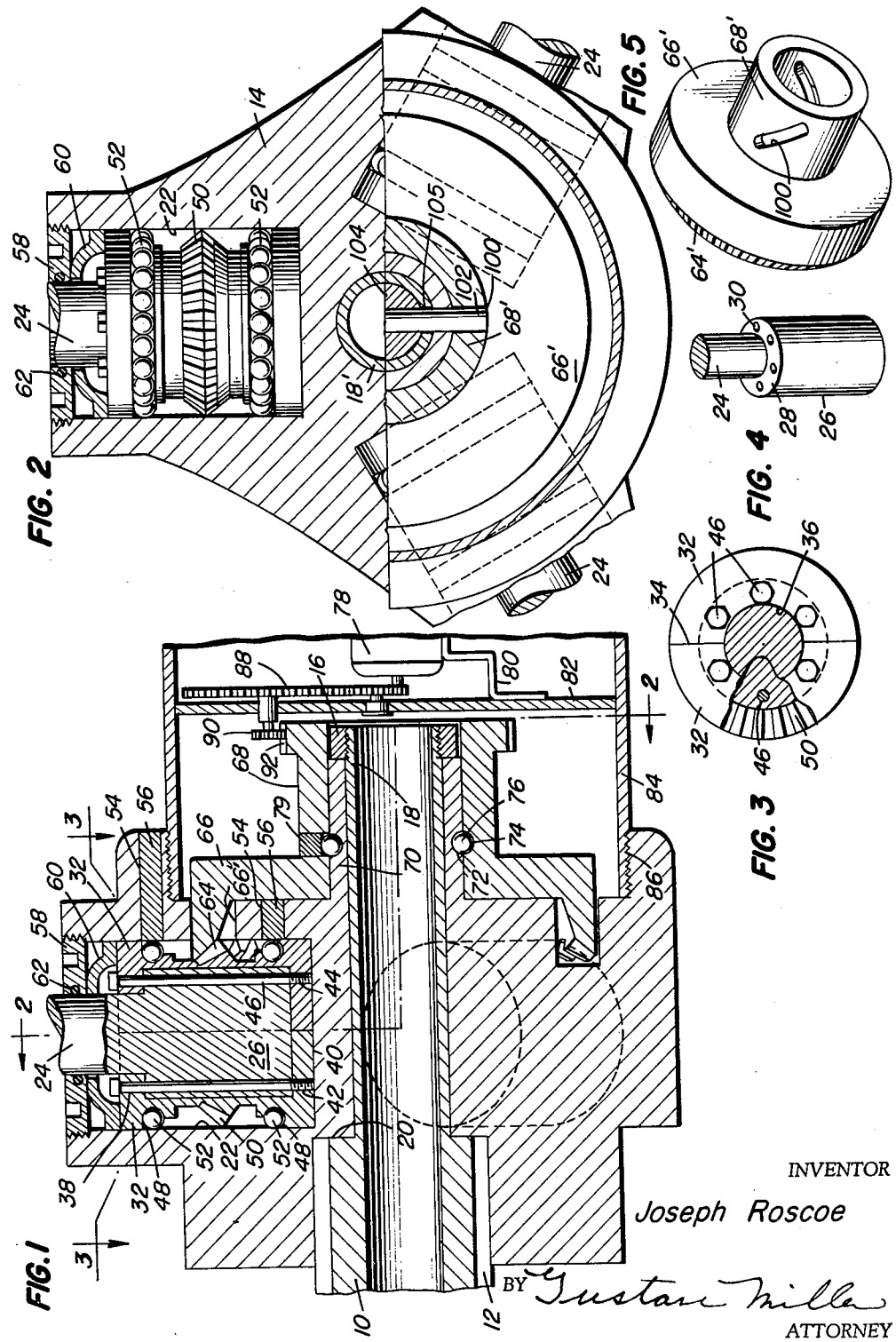

3,061,017
VARIABLE PITCH PROPELLER
Joseph Roscoe, R.F.D. 4, Colchester, Conn.
Filed Oct. 19, 1961, Ser. No. 146,207
5 Claims. (Cl. 170—160.3)

This invention relates to a variable pitch propeller and has for an object to provide an improved variable pitch propeller particularly intended for aircraft use.

It is an object of this invention to provide a variable pitch propeller and an improved means of mounting the propeller blades in a propeller hub, together with an improved means of adjusting the pitch of the propeller.

Still a further object of this invention is to provide a variable pitch propeller wherein the propeller blades have an improved means for mounting a bevel gear on the root of the propeller blade, together with a master bevel gear cooperating with the bevel gear of each propeller for simultaneously adjusting the pitch of the propeller, together with a means for controlling the master bevel gear, which controlling means may be operated either by an electric motor or by a cam arrangement operating through a suitable hydraulic control means.

Still a further object of this invention is to provide a one-piece hub for a variable pitch propeller, together with an improved gear control means for varying the pitch of propeller blades whose blade roots are mounted in the one-piece hub and controlled through improved means.

With the above and related objects in view, this invention consists in the details of construction and combination of parts as will be more fully understood from the following description, when read in conjunction with the accompanying drawings, in which:

FIG. 1 is a longitudinal sectional view through the one-piece hub and variable pitch propeller controlling mechanism of this invention, with an electrical control.

FIG. 2 is a sectional view on line 2—2 of FIG. 1, but showing a hydraulically operable cam mechanism as the control means.

FIG. 3 is a sectional view on line 3—3 of FIG. 1.

FIG. 4 is a perspective view of the propeller blade neck and root portion.

FIG. 5 is a perspective view of the cam controlled form of master bevel gear.

There is shown at 10 the engine or drive shaft to which is keyed at 12 the one-piece hub 14 of this invention secured to the engine or drive shaft 10 by a nut 16 threaded on the end of a reduced neck 18 of the engine shaft and having a shoulder 20 against which the hub 14 is secured by the nut 16, the key 12 causing the one-piece hub 14 to partake of the rotation of the shaft 10.

Extending radially in the hub 14 are a plurality of cylindrical shaped recesses 22, here shown as three in number, one for each of three propeller blades whose pitch is to be controlled and set by the means of this invention.

The propeller blade is mounted in any suitable manner on a propeller blade neck 24 which terminates in a propeller root portion 26, the root blade portion 26 of the propeller neck being substantially cylindrical in shape as apparent from FIGS. 1 and 4, the root portion 26 being connected to the propeller blade neck 24 by a shoulder 28. Extending through the shoulder 28 and in parallel relation with the axis of the neck 24, are a plurality of apertures 30, here shown as six in number. The apertures 30 and shoulder 28 serve in general for receiving a bevel gear and race body 32 thereon.

As seen from FIG. 3, this body 32 is a two-piece body longitudinally divided at the plane 34, and is internally cylindrical complementary to the shape of the root portion 26 of the propeller neck, and is internally flanged as at 36 complementary to the shoulder 28. This flange 36 is provided with apertures as at 38, which mate with apertures 30 in the shoulder of the root portion 26. The other end of the body 32 is provided with flanged caps 40 for extending across the bottom end of the propeller root portion 26, as illustrated in FIG. 1, and these flange caps 40 are provided with mating threaded apertures 42 for cooperating with threads 44 on the end of stud bolts 46 which extend through the flange apertures 38, the root apertures 30 and the threaded apertures 42 to firmly secure the ball race and bevel gear body 32 in position on the propeller root 26.

A pair of ball races 48 are formed adjacent each end of the body 32 and in between, there is provided a bevel gear 50. Ball bearings 52 are suitably provided on each of the races 48, being fed thereto through suitable openings 54 in the one-piece hub 14 which are thereafter sealed by any suitable plug as at 56.

The propeller neck 24 and root portion 26, together with the assembled body 32, are held within each of the radial recesses 22 of the hub 14 by means of a nut 58 threaded in the end of the recess against a thrust plate 60 which bears against the flange end of body 26, a bushing 62 being provided in the nut 58 to provide a lubrication seal while permitting the propeller neck 24 to rotate when the pitch of the propeller blade is being varied. Obviously, the nut 58 must be installed on the propeller neck 24 before the propeller blade is secured to the propeller neck in any suitable conventional manner.

In order to rotate the root portion 26 and thus control the pitch of the propellers thereon, a master bevel gear 64 extends through an annular opening 66″ in one side of the propeller hub 14, the master bevel gear 64 meshing with the bevel gear 50 of each propeller blade. The master bevel gear 64 is provided on the end of a flange 66 extending out from a sleeve 68 which is journaled on an extending nipple 70 of the propeller hub 14, this extending nipple 70 being that part of the propeller hub 14 against which the hub securing nut 16 bears to hold the hub 14 on the key 12 on the drive shaft 10.

To facilitate rotation of the sleeve 68 on the hub nipple 70, mating raceway recesses 72 and 74 are provided in the sleeve 68 and nipple 70, and filled with ball bearings 76 through an opening which is thereafter sealed by a plug 79. The ball bearings 76 thus serve the double function of keeping the master gear in mesh with each of the individual gears and at the same time, prevent the master gear sleeve 68 from separating from the hub spindle 70.

One suitable means for rotating the master gear 64 is an electric motor 78 suitably mounted on a bracket 80 on a support plate 82 within a housing or fairing 84 threadedly secured as at 86 in the forward end of the one-piece hub 14.

In operation, the hub and propeller blade and associated parts are assembled in accordance with the foregoing description, and the motor 78, a conventional self-synchronous motor, may be operated to rotate and set the pitch of the propeller blade through the gear train 88 and pinion gear 90 in mesh with a gear 92 formed on the end of the master bevel gear sleeve 68. Operation of the electric motor and the controls thereto are quite conventional and hence, need not be herein set forth.

In FIGS. 2 and 5, another means of controlling the operation of the master bevel gear is illustrated. In this form, a master bevel gear at 64′ is illustrated as being formed at the end of the flange 66′ of a sleeve 68′. In this case, instead of having a gear formed at the end of the sleeve 68′, the sleeve 68′ is provided with a pair of cam slots 100, and cam pins 102 extending through axially extending slots 105 in the engine or driving shaft end 18' mounted on a piston 104 located in the hollow end 18' of the driving engine shaft. This piston 104 may be controlled hydraulically in a conventional manner for axial movement within the hollow engine shaft 18' for movement in either direction, or for remaining stationary at any position, and thus controlled through the cam pins 102, the axially extending slots 104 and the cam slots 100, to adjust the setting of the propeller blade through the master bevel gear 64' cooperating with the individual bevel gears 50 in the same manner as in the previously described form.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A variable pitch propeller comprising a main drive shaft, a one-piece hub secured on said shaft, a plurality of propeller blades having root portions mounted in said hub for rotatable adjustment about radially extending axes, said root portions each being cylindrical in shape and each being connected to its blade by a reduced neck thereby providing a shoulder between said root portion and said reduced neck, said shoulder having a plurality of bolt apertures extending therethrough and through said root portion parallel to the axis of said blade root, a two part bevel gear and ball race body for each said blade root, each said two part bevel gear and ball race body comprising a longitudinally divided internally cylindrical body internally complementary to said root portion, said body having an internal flange at one end complementary to said root portion shoulder, and an internally extending cap at its other end abutting the end of said blade root, said body cap and flange having apertures mating with said shoulder bolt apertures, stud bolts extending through said mating flange shoulder and cap apertures securing said body to said root portion, means for mounting said blade root portions and said bevel gears and ball races in said hub comprising axially extending cylindrical recesses in said hub, nut means about said blade neck threaded in the ends of said axial recesses, and a thrust plate between said nut means and said bevel gear and ball race body, a master bevel gear rotatably mounted on said hub and meshing with each of said root portion secured bevel gears, said master bevel gear being journaled on said hub about the axis of said drive shaft, and controllable means for rotating said master bevel bear to simultaneously set the pitch of each said propeller blade.

2. The variable pitch propeller of claim 1, said master bevel gear comprising a sleeve journaled on said hub about the axis of said drive shaft, a flange on said sleeve, and bevel gear teeth on said flange.

3. The variable pitch propeller of claim 2, said controllable means comprising an electric motor, and gear means connecting said electric motor to said master bevel gear sleeve.

4. The variable pitch propeller of claim 2, said sleeve having cam slots therein, and cooperating cam means for said cam slots for rotating said sleeve and master bevel gear.

5. The variable pitch propeller of claim 2, and a fairing housing about said sleeve threadedly secured to said hub.

References Cited in the file of this patent

UNITED STATES PATENTS

| | | |
|---|---|---|
| 1,847,502 | Thomas | Mar. 1, 1932 |
| 2,017,505 | Meon | Oct. 15, 1935 |
| 2,482,217 | Sacchini | Sept. 20, 1949 |
| 2,491,862 | Klos | Dec. 20, 1949 |
| 2,629,451 | Nichols | Feb. 24, 1953 |
| 2,971,585 | Whittle | Feb. 14, 1961 |